United States Patent [19]
Herridge

[11] Patent Number: 5,372,381
[45] Date of Patent: Dec. 13, 1994

[54] AIR BAG WITH INFLATABE RIBS

[75] Inventor: John T. Herridge, Columbus, Ohio

[73] Assignee: Daicell Chemical Industries, Ltd., Sakai, Japan

[21] Appl. No.: 210,260

[22] Filed: Mar. 18, 1994

Related U.S. Application Data

[63] Continuation of Ser. No. 865,197, Apr. 8, 1992, abandoned.

[51] Int. Cl.⁵ .................... B60R 21/16; B60R 21/24
[52] U.S. Cl. ............... 280/743 R; 280/743 A
[58] Field of Search ........... 280/728 A, 728 R, 730 R, 280/736, 738, 742, 743 A, 743 R

[56] References Cited

U.S. PATENT DOCUMENTS

| | | | |
|---|---|---|---|
| 3,532,360 | 10/1970 | Leising et al. | |
| 3,618,980 | 11/1971 | Leising et al. | |
| 3,632,133 | 1/1972 | Haas | |
| 3,675,942 | 7/1972 | Huber | 280/738 |
| 3,731,949 | 5/1973 | Radke | 280/743 |
| 3,747,952 | 7/1973 | Graebe | 280/730 |
| 3,792,873 | 2/1974 | Buchner et al. | 280/743 |
| 3,883,154 | 5/1975 | McCullough, Jr. et al. | 280/743 X |
| 3,907,327 | 9/1975 | Pech | 280/743 X |
| 3,985,076 | 10/1976 | Schneiter | |
| 4,076,277 | 2/1978 | Kuwakado et al. | 280/743 X |
| 4,278,638 | 7/1981 | Nilsson et al. | 422/166 |
| 4,296,084 | 10/1981 | Adams et al. | 423/351 |
| 4,500,114 | 2/1985 | Grey, Jr. | 280/742 |
| 4,530,516 | 7/1985 | Adams et al. | 280/741 |
| 4,547,342 | 10/1985 | Adams et al. | 422/166 |
| 4,561,675 | 12/1985 | Adams et al. | 280/734 |
| 4,578,247 | 5/1986 | Bolleau | 422/165 |
| 4,590,041 | 5/1986 | Hill | 422/165 |
| 4,722,551 | 2/1988 | Adams | 280/736 |
| 4,830,401 | 5/1989 | Honda | 280/736 |
| 4,943,086 | 7/1990 | Cunningham | 280/741 |
| 5,018,762 | 5/1991 | Suzuki et al. | 280/742 X |

FOREIGN PATENT DOCUMENTS

| | | | |
|---|---|---|---|
| 2406500 | 8/1974 | Germany | 280/743 |
| 2406501 | 8/1974 | Germany | 280/743 |
| 2409409 | 8/1974 | Germany | 280/743 |
| 47-30045 | 11/1972 | Japan | |
| 50-16057 | 6/1975 | Japan | |
| 63-301144 | 12/1988 | Japan | |
| 1455661 | 11/1976 | United Kingdom | 280/743 |
| 1461303 | 1/1977 | United Kingdom | 280/743 R |
| 3021037 | 10/1993 | WIPO | 280/743 R |

Primary Examiner—Brian L. Johnson
Attorney, Agent, or Firm—Weingram & Zall

[57] ABSTRACT

An air bag having inflatable ribs is provided for use in connection with a gas generator for protecting a passenger from injury due to impacts. A gas generator includes a housing, a gas generation device disposed inside the housing, an air bag fitted to the housing, and a gas jet opening. The air bag includes an air storage chamber for receiving air via a plurality of air intake ports disposed in the air bag and storing it therein. Also included are a plurality of hollow ribs each being disposed in the air storage chamber, each having one end thereof in communication with the gas jet opening. Each of the hollow ribs comprises a tube-like gas storage chamber for receiving a combustion gas via the gas jet opening and storing it therein. The gas storage chamber is equipped with an opening for supplying the combustion gas inside the gas storage chamber to the air storage chamber. Each of the hollow ribs has a predetermined length such that when the gas storage chamber is filled with combustion gas, the internal space defined by the plurality of the hollow ribs is equivalent to the volume of the air bag.

13 Claims, 4 Drawing Sheets

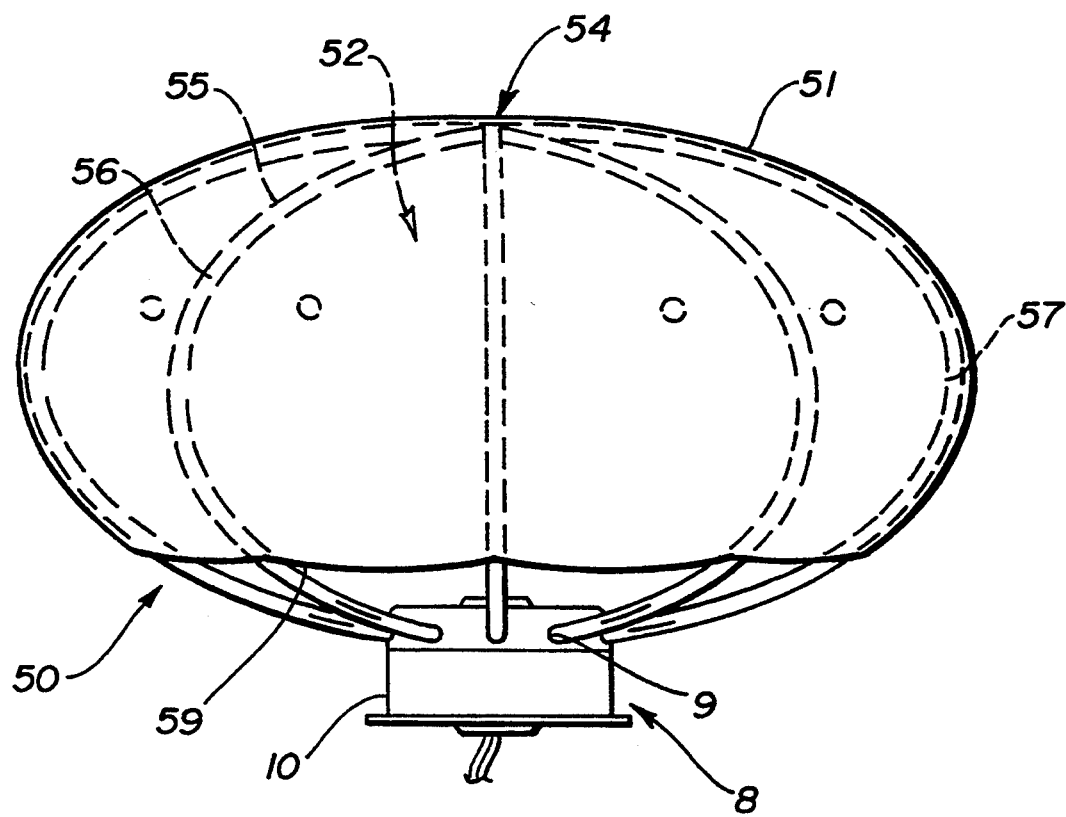

AIR BAG WITH INFLATABE RIBS

This is a continuation of application Ser. No. 07/865,197 filed on Apr. 8, 1992 and now abandoned

BACKGROUND OF THE INVENTION

1. Field of the Invention

This invention relates to an air bag for use in connection with a gas generator for protecting a passenger from impact, and more particularly to an air bag having an inflatable rib structure.

2. Prior Art

In conventional gas generators, air bags are comprised of a bag-like member and a combustion gas is charged into this bag-like member.

Conventional gas generators need a predetermined quantity of a combustion gas to inflate an air bag. Therefore, a predetermined quantity of a gas generating agent for generating this combustion gas is also necessary. Furthermore, a necessary quantity of a filter for filtrating and cooling the combustion gas must be secured, as well.

Therefore, since a storage space for storing a predetermined quantity of the gas generating agent, the filter, etc, must be secured inside the gas generator, it has been difficult conventionally to reduce the dimension of the gas generator.

U.S. Pat. No. 3,532,360 to Leising, et al, discloses a gas generating apparatus having a housing, a gas generating section a coolant chamber, and an inflatable bag. The housing is generally bowl shaped and includes a bottom wall and a side wall. The gas generator is separated from the air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising, et al, discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the materials towards the walls of the chamber in which they are positioned, causing the materials to travel in a generally circular pass, thereby enhancing combustion of the propellant. Because of their mass and velocity, reacting particles are kept in the chamber until fully consumed. A gas generator is contained in two housings that are connected together by plurality of fasteners.

U. S. Pat. No. 3,632,133 to Hass, discloses an inflatable air bag that includes a gas generator which, upon ignition, produces a high velocity gas stream directed into the converging end of a converging-diverging nozzle and then into the inflatable air bag. The high velocity stream of gas influences the drawing of gas from the exterior of the gas generator into the air bag.

U.S. Pat. No. 3,985,076 to Schneiter et al, discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled through the peripheral orifices into an inflatable structure.

U.S. Pat. No. 4,296,084 to Adams et al, discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al, discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U.S. Pat. No. 4,530,516 to Adams, et al, discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U. S. Pat. No. 4,547,342 to Adams, et al, discloses a gas generator for use with an inflatable air bag comprising a housing having an upper shell and a lower shell welded together. Within the housing are three integrally formed concentric cylinders defining chambers within the housing. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability and decrease the degradation of the generator and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizguchi, discloses a structure of an air bag comprising a lattice configuration or a multiple pillar-shaped configuration so that less air is required for inflation of the air bag.

Japanese Patent No. JP 47-30045 to Kogyo, discloses a rapidly inflatable apparatus for shock absorption comprised of a series of tube-like inflators linked together by a piece of material which accepts an accelerated body after a collision.

Japanese Patent No. JP 50-16057 to Toyota Motor Corporation, discloses an air bag having inner and outer films joined by blocked connecting portions which take on a lattice or wave-like shape to maintain the shape of the bag.

OBJECTS AND SUMMARY OF THE INVENTION

The air bag of the present invention is fitted to a housing of a gas generator. It inflates rapidly on receiving a combustion gas generated by a gas generation device inside a housing via gas jet opening. It forms a cushion between a passenger and a hard structure and protects the passenger from an impact.

The air bag of the present invention is used in connection with a gas generator that includes a housing, and a gas generation device disposed in the housing. The air bag is fitted to the housing and a gas jet opening allows the air bag to communicate with the housing. The air bag of the present invention comprises a film that forms an air storage chamber for receiving air via a plurality of air intake ports disposed in the air bag, and a plurality of hollow ribs, each disposed in the air storage chamber, each having one end thereof connected to the gas jet opening and the other end connected to selected "lift" points positioned at or near the fully deployed extremities of the air bag. Each rib constitutes a tube-like gas storage chamber for receiving a combustion gas via the gas jet opening and temporarily storing it therein. Each gas storage chamber is equipped with an opening for allowing the gas storage chamber to communicate with the air storage chamber. Each rib is of a predetermined length such that when the combustion gas is packed into the gas storage chamber, internal spaces defined by a plurality of the ribs are equivalent at least to the volume of the air bag.

When the combustion gas is introduced into the gas storage chamber, the hollow ribs rapidly inflate in a radial direction and in an axial direction and inflate the air bag. Air is caused to enter the air storage chamber via the air intake ports. The combustion gas is introduced into the air storage chamber via the openings in the gas storage chambers. In this way, the combustion gas is charged into the gas storage chamber, and the air and the combustion gas are charged into the air storage chamber. The air bag is inflated and supported by the ribs. Accordingly, an amount of combustion gas is needed only to inflate the ribs, thereby reducing the amount of combustion gas necessary to inflate the air bag.

Accordingly, it is an object of this invention to provide an air bag for use in connection with a gas generator, which air bag requires a reduced amount of gas for inflation of the air bag.

It is another object of this invention to provide an air bag for use in connection with a gas generator, which air bag is of a hollow-ribbed construction.

It is still another object of this invention to provide an air bag for use in connection with a gas generator, which air bag requires only an amount of gas necessary to inflate the ribs for inflation of the air bag.

It is yet another object of this invention to provide an air bag for use in connection with a gas generator, which air bag may be quickly inflated because of the reduced amount of gas needed for inflation.

It is yet another object of this invention to provide an air bag for use in connection with a gas generator, which air bag may be used in connection with a gas generator of reduced size because of the reduced amount of gas generant needed to produce the reduced amount of gas for inflation of the air bag.

BRIEF DESCRIPTION OF THE DRAWINGS

These and further objects of the present invention will become apparent to those skilled in the art from review of the following Detailed Description of the Invention and accompanying drawings in which:

FIG. 4 is a schematic view of an air bag of the present invention having a film that extends partially about the air bag.

DETAILED DESCRIPTION OF THE INVENTION

Figure 1:
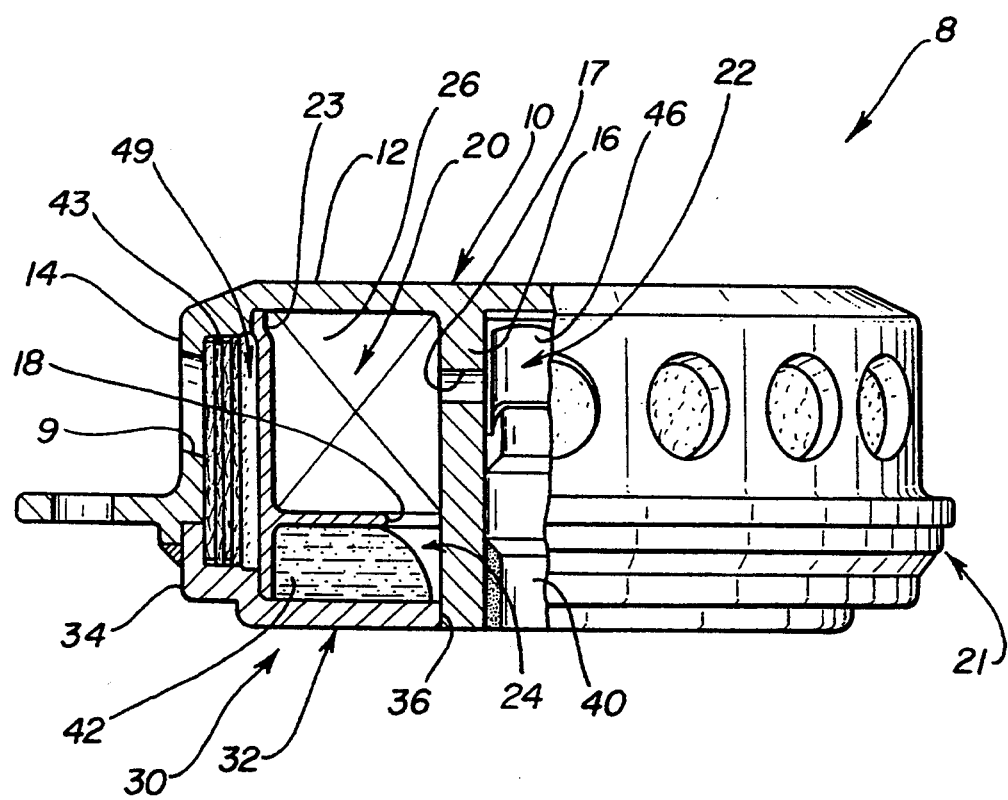
FIG. 1 is a semi cross-sectional view of a gas generator that may be equipped with an air bag having inflatable ribs in accordance with the present invention.

FIG. 1 is a semi cross-sectional view of a gas generator 8 that may be equipped with an air bag with inflatable ribs in accordance with the present invention. The housing of this gas generator, indicated generally at 21 comprises a diffuser shell 10 and a closure shell 30. The diffuser shell 10 and the closure shell 30 each have a circular part, 12 and 32 respectively, and an outer wall, 14 and 34 respectively, formed around the outer peripheral portion of the circular parts 12 and 32. The diffuser shell is equipped at the center of the circular part 12 with a center tube 16 which is formed integrally with the circular part 12. The top of the center tube 16 extends to the position on the outer surface of the closure shell 30. The closure shell 30 is equipped with a hole into which this center tube 16 can be fitted.

The inside 20 of the housing 21 is defined in the circumferential direction by the center tube 16. An ignition device chamber 22 is formed inside the center tube 16. A combustion chamber 26 and a coolant chamber 24 are formed outside the ignition device chamber 22 by a combustion ring 23, and a filter chamber 49 is formed in such a way as to encompass the combustion chamber 26.

A squib (igniter) 40 and an enhancer (transfer charge) 46 are disposed in the ignition device chamber 22 and a gas generating agent (not shown) is loaded into the combustion chamber 26. A coolant 42 and a filter 43 are disposed in a coolant chamber 24 and a filter chamber 49, respectively.

The openings 17 defined between the ignition device chamber 22 and the combustion chamber 26 for transmitting the flame of the transfer charge 46 to the combustion chamber 26, and the openings 18 for introducing the gas generated in the combustion chamber 26 is defined between the combustion chamber 26 and the coolant chamber 24. The coolant chamber 24 and the filter chamber 49 communicate with each other via an opening (not shown) and an opening for exhausting a gas passing through the coolant and the filter, that is jet ports 9, are disposed on the outer wall 14 of the diffuser shell between the filter chamber 49 and the air bag (FIG. 2).

Figure 2:
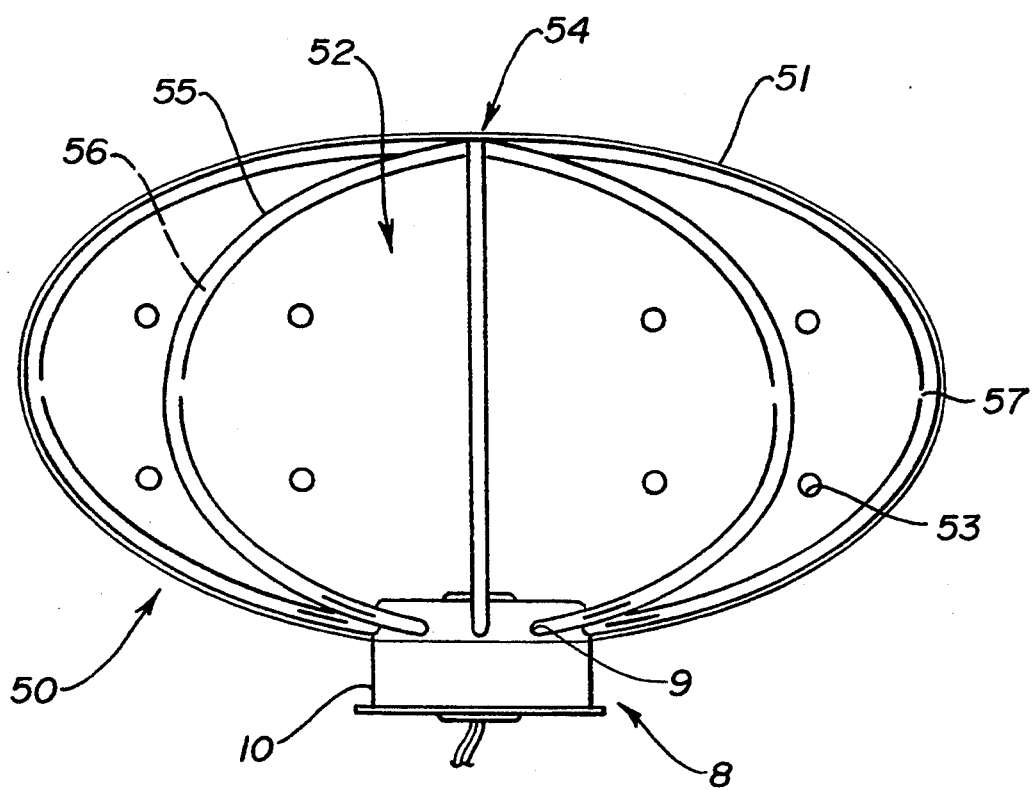
FIG. 2 is a schematic view of an air bag having inflatable ribs in accordance with the present invention.
Figure 3:
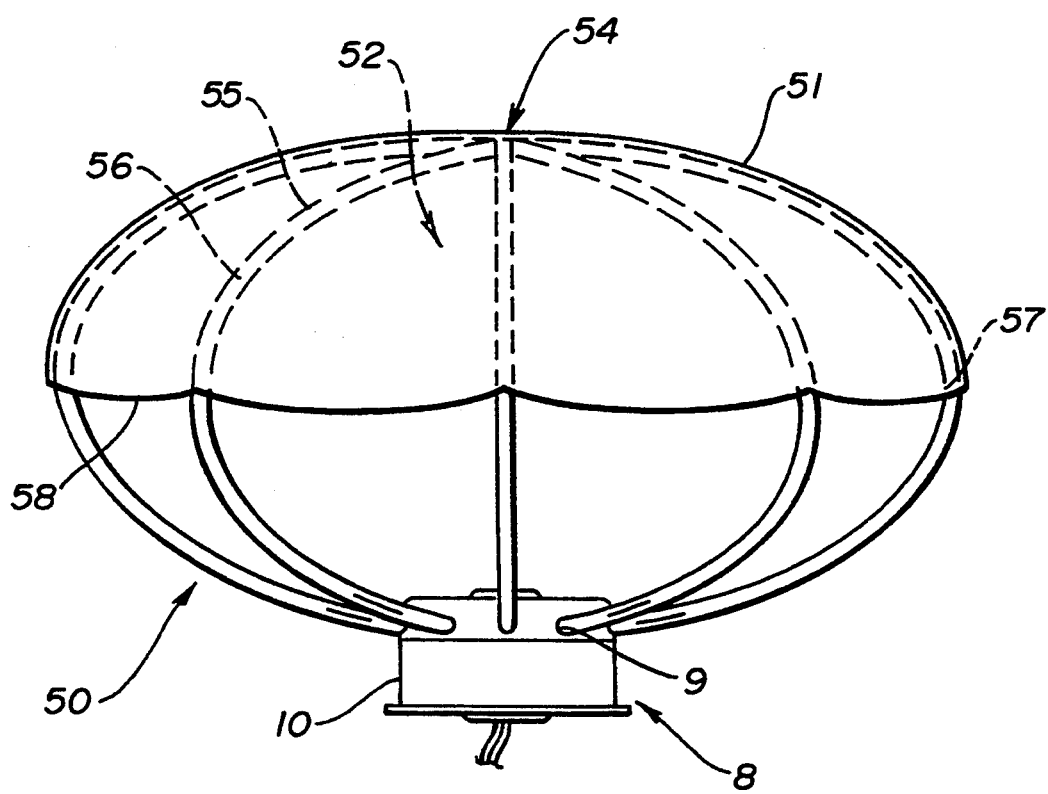
FIG. 3 is schematic view of the air bag of the present invention having inflatable ribs connected by a circumferencial link.

FIG. 2 is a schematic view of the air bag with inflatable ribs of the present invention. The air bag, indicated generally as 50, is fitted to the diffuser shell 10 of the gas generator 8 and constitutes an air storage chamber 52. The air storage chamber 52 is typically formed of a material or film 51 formed into a spherical shape. Air is introduced into the air storage chamber 52 via a plurality of air intake ports 53 disposed in the air bag 50. The diameter of the air intake ports 53 are designed to a predetermined size so that as much air can be taken into the air storage chamber as to enable the air storage chamber 52 to inflate within a predetermined time and to produce the desired energy absorption deflation function as the vehicle occupant causes the air bag to collapse during a collision event.

The air bag 50 comprises a plurality of hollow ribs or struts 55. In one embodiment, the inflation means comprises eight hollow ribs 55 that extend radially along the perimeter of air bag 50. The ribs 55 terminate in an end collection portion 54. The ribs 55 are typically disposed within the air storage chamber 52 of air bag 50. One end of each hollow rib 55 is connected to the jet ports 9 and the other end is connected to selected lift points 54 positioned at or near the fully deployed extremities of the air bag 50. Each hollow rib 55 constitutes a tube-like gas storage chamber 56 which receives combustion gas from the gas generator 8 via the jet opening 9 and temporarily stores it therein. Each gas storage chamber 56 is equipped with an opening 57 for supplying combustion gas inside the gas storage chamber 56 to the air storage chamber 52, to relieve excess gas pressure inside the gas storage chamber 56, prevent breakage of the hollow ribs and allow the air bag to totally collapse after the collision event is over. Each hollow rib 55 is of a length so that when the gas storage chamber 56 is filled with combustion gas, the inner space defined by the ribs 55 is equivalent to the capacity of the air bag.

The number of ribs 55 may be increased so that the ribs 55 themselves function as the cushioning means. In such an embodiment, the film 51 forming the air bag 50 can be omitted. Note that in the event that enough ribs 55 are used so that it is unnecessary for use of a film 51, the air storage chamber 52 will be formed by the ribs 55, and upon inflation of the ribs 55, air from the atmosphere will be sucked into the air storage chamber through between the ribs 55. Also note, that it would be necessary to secure the relative position of each rib with respect to the other ribs by a circumferential link 58.

When a sensor (not shown) is activated by an impact, an electric signal is sent to the initiator of the squib 40 and ignites it, so that the transfer charge 46 is ignited. The high pressure and high temperature flame generated at this time passes through the opening 17 and ignites the gas generating agent inside the combustion chamber 26. The gas generated inside the combustion chamber 26 passes through the opening 18 and then through the coolant 42 and the filter 43, and flows into the gas storage chambers 56 of each hollow rib 55 through the jet opening 9.

The high pressure combustion gas flowing into the gas storage chambers 56 of the hollow ribs 55 causes the ribs to rapidly inflate in the radial and axial directions and expand the air bag 50. Accordingly, the air bag 50 inflates, and with the inflation of the ribs 55, air being pulled into the air storage chamber 52 through air intake ports 53. High pressure combustion gas is introduced via openings 57 into the air storage chamber 52. In this way, the air bag is rapidly inflated by the hollow ribs 55 and forms a cushion between the passenger and a hard structure.

In the air bag with inflatable ribs of the present invention, only as much combustion gas as is necessary to inflate the hollow ribs 55 is required for inflation of the air bag 50. Thus, the quantity of the combustion gas can be reduced. Accordingly, the quantity of the gas generant necessary for generating the required amount of combustion gas can be reduced. Further, the volume of the gas combustion chamber for storing the gas generant can be reduced, as well as the volume of the filter for filtrating and cooling the combustion gas and the capacity of the storage chamber for storing the filter. As a result, a reduction of the overall dimension and weight of the gas generator can be accomplished, thereby reducing manufacturing costs.

It is important to note that the film 51 forming air bag 50 may extend over the entire surface of the air bag 50, or, alternatively, could extend over some portion of the air bag 50. Typically, the film will extend over the uppermost portion of the air bag, at collection portion 54, to a distance 59 along the air bag 50 near the gas generator 8. This allows the air storage chamber 52 to suck air in more quickly during inflation of the gas storage chambers 56 by a combustion gas.

It is also important to note that any number of hollow ribs 55 comprising an inflatable cushioning device may be used. As the number of ribs 55 used increases, the need for a film 51 extending about the ribs 55 diminishes. It should also be noted that the diameter of the tubes may be varied in accordance with this invention and that some of these tubes could also provide the function of internal tethers used to cause the bag to assume a preferential shape.

In the preferred embodiment, one end of each rib 55 communicates directly with a jet opening 9. However, it is within the scope of this invention that a manifold may be used to interconnect the hollow ribs with the gas generator housing. The manifold would serve to distribute the gas from the jet openings to the hollow ribs.

Further, because the volume of the air that fills the air storage chamber is drawn from within the interior of the vehicle passenger compartment, pressurization of the passenger compartment due to the inflation of the air bag is reduced.

Also, since the combustion gas is mixed with air in the air storage chamber, the resulting mixture, when expelled into the vehicle passenger compartment upon deflation of the air bag will be cooler and of a less concentrated mixture.

Having thus described the invention in detail, it is understood that the foregoing description is not in- tended to limit the spirit and scope thereof. What is desired to be protected by Letters Patent is set forth in the appended claims.

What is claimed is:

1. An inflatable cushioning device for use in connection with a gas generator comprising:
   a plurality of hollow ribs for receiving combustion gas from a gas generator, each of the plurality of ribs having an open end and a terminal end;
   attachment means for attaching the open end of each of the plurality of the hollow ribs to a gas generator;
   connection means for connecting the terminal end of each of said hollow ribs together to form an air bag;
   positioning means for positioning each of said plurality of hollow ribs with respect to the other hollow ribs about the air bag;
   inflating means for intruding gas produced by a gas generator into each of the plurality of hollow ribs to inflate the hollow ribs to form a cushioning device.

2. The apparatus of claim 1 wherein each of the plurality of hollow ribs has a venting aperture therein to permit escape of excess combustion gas therefrom.

3. The apparatus of claim 1 wherein the attachment means for attaching the hollow ribs to the gas generator comprises means for distributing gas generated by the gas generator to the hollow ribs.

4. The apparatus of claim 1 wherein the attachment means includes a means for connecting each of the plurality of hollow ribs to a jet opening of a gas generator.

5. The apparatus of claim 1 wherein the positioning means comprises circumferential linkages extending between adjacent hollow ribs.

6. The apparatus of claim 1 further comprising a film disposed about and fitted to the plurality of hollow ribs to form an air storage chamber.

7. The apparatus of claim 6 wherein the film includes a plurality of air intake ports for permitting communication of the air storage chamber with the environment, wherein, upon impact, the gas generator produces a gas that is charged into each of the plurality of hollow ribs to inflate the hollow ribs and pull the film into an open position, causing air from the environment to be pulled into the air storage chamber.

8. The apparatus of claim 7 wherein the film extends only from the connection means for the ribs, about the ribs, to near the gas generator.

9. The apparatus of claim 7 wherein each of the plurality of hollow ribs each have a venting aperture therein to permit flow of the combustion gas from the hollow ribs into the air storage chamber.

10. An air bag for use in connection with a gas generator comprising:
    a segment of film comprising an air storage chamber, said film having a plurality of air intake ports extending therethrough;
    a plurality of hollow ribs, each having an open end and a terminal end, each forming a gas storage chamber, disposed in the air storage chamber;
    attachment means for attaching and communicating the open ends of the hollow ribs with a gas generator;
    connection means for connecting the terminal ends of each of the plurality of hollow ribs together to form an air bag;
    securing means for securing the film about the hollow ribs, the film extending about the terminal ends of the ribs towards the open ends of the ribs;
    apertures in each of the plurality of hollow ribs forming a gas vent for releasing combustion gas from each gas storage chamber into the air storage chamber; and
    means for introducing a gas generated by a gas generator into the gas storage chamber to inflate the plurality of gas storage chambers to inflate the air bag, causing air to be drawn into the air storage chamber through the air intake ports in the film to inflate the air bag.

11. The apparatus of claim 10 further comprising positioning means for positioning each of the hollow ribs with respect to the other hollow ribs.

12. The apparatus of claim 10 wherein the attachment means for attaching the hollow ribs to the gas generator comprises manifold means for distributing gas generated by a gas generator to the hollow ribs.

13. The apparatus of claim 10 wherein the attachment means includes a means for connecting each of the plurality of hollow ribs to a jet opening of a gas generator.

* * * * *